No. 760,738. Patented May 24, 1904.

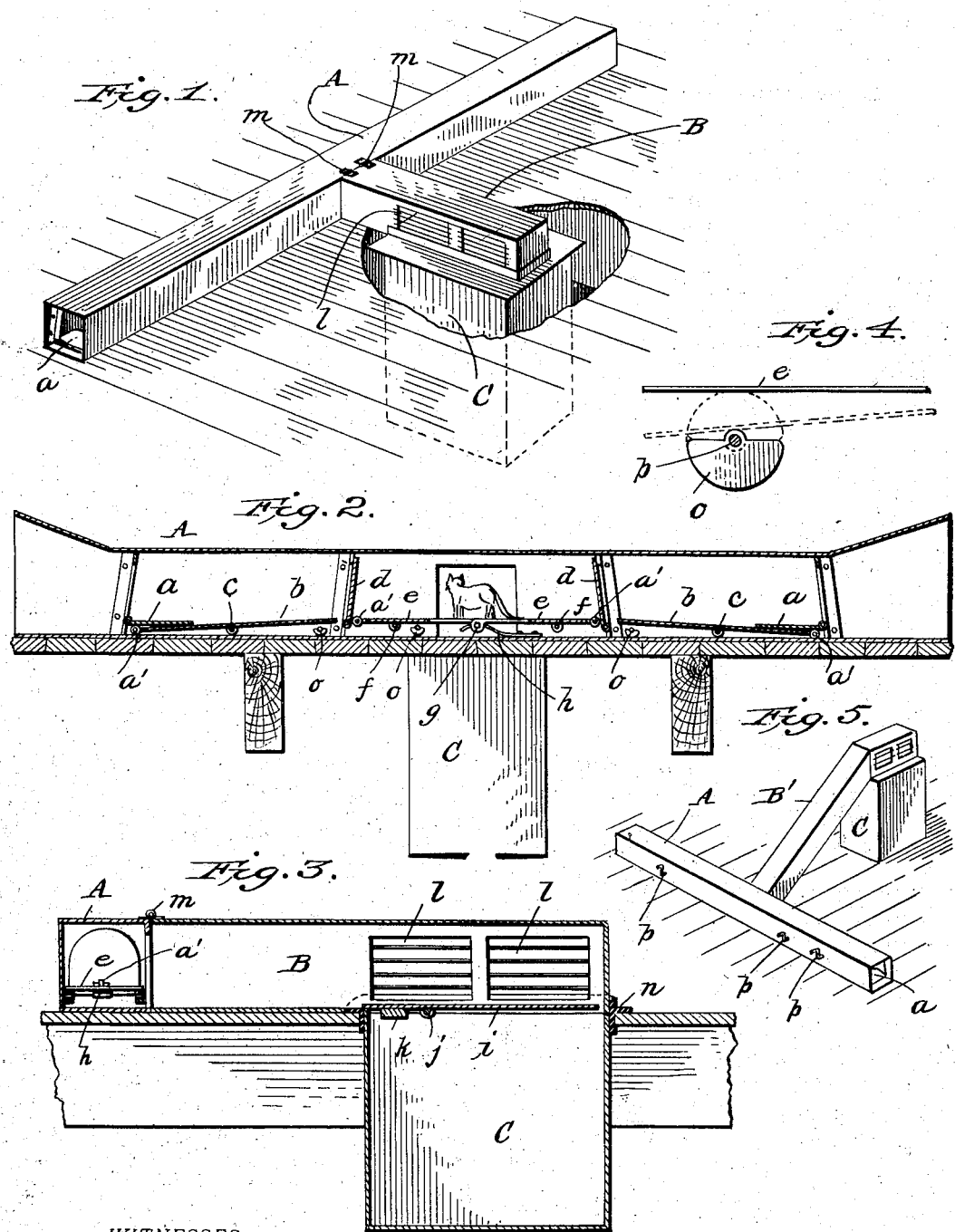

UNITED STATES PATENT OFFICE.

ADAM EDGAR HUGULEY, OF HENRY, OKLAHOMA TERRITORY.

ANIMAL-TRAP.

SPECIFICATION forming part of Letters Patent No. 760,738, dated May 24, 1904.

Application filed September 23, 1903. Serial No. 174,294. (No model.)

*To all whom it may concern:*

Be it known that I, ADAM EDGAR HUGULEY, a citizen of the United States, and a resident of Henry, county of Osage Nation, Territory of Oklahoma, have invented certain new and useful Improvements in Animal-Traps, of which the following is a specification, reference being had therein to the accompanying drawings, in which—

Figure 1 is a perspective view of the trap, showing the water-tank located below the floor; Fig. 2, a longitudinal sectional view thereof; Fig. 3, a transverse vertical sectional view; Fig. 4, a detail view of the treadle-locking mechanism, and Fig. 5 a detail perspective view showing the water-tank arranged above the floor.

This invention relates to that class of traps which consist of a runway and a cage or tank connected therewith and in which the animal is finally caught.

It has for its object to provide a tubular runway, which is normally open throughout its length, and to mount therein automatic closure devices which will be operated by the animal to cut off its exit. This tubular runway is connected by a lateral tubular runway with the cage or tank into which the animal is led.

A further object of the invention is to provide means by which the closure devices may be locked in their open position in order that the animals may pass entirely through the runway without being caught.

Referring to the various parts by letters, A designates the main tubular runway, which is normally open at its ends and communicates, through one of its side walls midway its ends, with the transverse runway B. This transverse runway is closed at its outer end and communicates, through its bottom, with the water tank or cage C. The ends of the main runway are adapted to be closed by hinged doors $a$, said doors being pivoted along their lower edges and swinging inward and downward. Just inside of each swinging door $a$ is a horizontal treadle $b$, which is mounted about midway its ends on a pivot $c$. Each door $a$ in its normal position rests on the outer end of the adjacent treadle $b$ and depresses it, thereby raising the inner end thereof. Mounted on the outer end of each treadle $b$ is a small antifriction-roller $a'$, which bears on the inner face of the door $a$. The weight of the forward portion of the treadle $b$ and the door $a$ resting thereon is sufficient to elevate the inner end of said treadle. It will therefore be seen that the ends of the main runway are normally open and that the inner ends of the treadles $b$ are normally raised.

Between the inner ends of the two treadles $b$ is arranged a double treadle, formed of two members $e$ $e$, each of said members being mounted on a transverse pivot $f$ and the inner ends thereof being connected together by a transverse pivot $g$. This double treadle occupies the middle portion of the main runway A. This middle portion is separated from the end portions of the runway by doors $d$, which are pivoted along their horizontal edges and normally swing inward and downward and rest on the outer portions of the members $e$ $e$ of the double treadle. In the outer ends of this double treadle are mounted antifriction-rollers $a'$, which act in the same manner as the similar rollers in the outer ends of the treadles $b$. Below the double treadle is arranged a spring $h$, which normally maintains the middle portion of the double treadle elevated and the end portions depressed, so that the doors $d$ will normally open and rest on the double treadle.

The transverse runway $b$ communicates with the middle compartment of the main runway, through one of the side walls thereof, at a point adjacent to the inner ends of the members $e$ $e$ of the double treadle. The side walls of this transverse runway near their outer ends are slotted or perforated in any manner to admit light and air, and the bottom of this runway, at the end thereof, is in open communication with the cage or tank C. This opening is normally closed by a tilting platform $i$, which is mounted near one of its ends on a horizontal pivot $j$, weight $k$ being provided to normally maintain the platform in a horizontal position. The end of said platform adjoining the weight rests on the adjacent edge of the tank, this edge preferably being the one nearest to the main runway.

The operation is as follows: An animal entering either end of the main runway will as soon as it passes beyond the pivot c depress the inner end of the treadle b, and thereby swing the door a up to its closed position and maintain it closed as long as the animal remains on the inner portion of the treadle. This prevents the return of the animal; but as the runway is entirely open to its other end the animal will move inward beyond the door d and on the double treadle. As soon as it has passed beyond the pivot f the center portions of said double treadle will be depressed and the end portions raised, thereby closing both doors d and shutting the animal within the middle compartment. The only exit now for the animal is into the transverse runway B, and as this is lighted at its outer end the animal will naturally pass therein and onto the tipping platform. It is obvious that as soon as it passes beyond the pivot j the platform will tip, depositing the trapped animal into the tank or cage C and then automatically returning to its normal horizontal position. As soon as the animal passes into the transverse runway B the spring h will automatically raise the inner ends of the members of the double treadle and permit the doors d to drop down to their normal open position.

It will be noted that the antifriction-rollers operate on the doors a and d, closing them with very little friction and practically no noise. It will also be noted that when these doors are in their closed position they incline slightly inward, so that they quickly fall back inward to their open position when the weight of the animal is removed from the treadles.

Below the inner ends of the treadles are mounted locking-cams o, these cams being secured to horizontal shafts p, whose projecting ends are formed into cranks. The purpose of these locking-cams o is to permit the treadles to be locked to prevent the doors a and d being closed as the animals pass into the main runway. The object of this is to permit the animals to use the runway for a time without being caught, thereby allaying suspicion. To set the trap, the cams are turned to the position shown in Figs. 2 and 4, and to lock the trap unset the cams are turned up in the position shown in dotted lines in Fig. 4.

The tank C is provided with an upward-extending flange n on its top, within which fits the transverse runway B, said tank within the flange being open to permit the tilting platform to pass down into it. The transverse runway may be hinged at its inner end to the main runway, as shown at m in Fig 1 and 3. This permits the said transverse runway to be swung upward, so that the tank may be removed and emptied and replaced without moving the main runway. It is obvious, however, that the two runways may be rigidly connected together.

When the trap is to be used in barns, it is desirable that a hole be cut in the barn-floor and the tank set therein to permit the two runways to be placed on a level, as shown in Fig. 1. It is also desirable that when the trap is to be used out of doors that a hole be dug in the ground to receive the tank or cage. When, however, the trap is to be used in residences, the transverse runway is set on an incline, as at B' in Fig. 5, to elevate the animal to the top of the tank, the tank being placed on the floor on a level with the main runway. It is desirable that the ends of the main runway be enlarged, as shown at Fig. 2, and it is manifest that these enlargements may be secured rigidly to the main runway or be integral portions thereof.

The trap is especially designed to catch rats and mice; but it is obvious that it may be used to catch all kinds of small animals. It may be baited or not, as desired.

An advantage of employing a middle compartment and two end compartments and separating them by automatically-closing doors lies in the fact that should the tank or other receptacle become filled or be inconvenient of attachment or injured beyond use the trap may still be available to catch three or more animals, since the end compartments will remain open and set even though an animal remain in the middle compartment. The trap may also be available for catching three or more animals should the one or more entrapped in the middle section be too wary to pass onto the treadle i.

Having thus described my invention, what I claim as new, and desire to secure by Letters Patent, is—

1. An animal-trap comprising, a main runway normally open throughout its length, normally open pivoted doors therein at its ends, a treadle therein at each end, the inner end of each treadle being normally elevated, its outer end supporting the adjacent door and being adapted to close said door when the inner end of the treadle is depressed, a double treadle between the two outer treadles, inward and downward swinging doors at each end of said double treadle, means for normally elevating the inner portion of the double treadle, and means whereby when said inner portion is depressed the outer ends of said double treadle are raised to close the adjacent doors, a transverse runway connected to the main runway adjacent the double treadle, a tilting platform in said transverse runway and a receptacle in communication with said transverse runway and adapted to receive the tilting platform.

2. In a trap, the combination of an open-ended tubular runway, a middle compartment and two end compartments, an outwardlyclosing door at the outer end of each end compartment and at the ends of the middle compartment, means for automatically independently closing each outer door, means for simultaneously automatically closing the doors of the middle compartment, a lateral runway connected to the middle compartment, and a receptacle connected to the end of this lateral runway.

3. An animal-trap comprising, a tubular runway, normally open doors therein, means to close said doors, and means to lock the door-closure means to prevent the doors being closed, and a receptacle connected to said tubular runway.

4. In a trap, the combination of an open-ended runway, normally open doors therein, tilting treadles for automatically closing said doors, devices for temporarily locking these treadles against operation and a receptacle connected to said runway.

5. An animal-trap comprising, a main tubular runway, normally open doors therein, means for closing said doors, a lateral tubular runway hinged at one end to the main runway and adapted to swing upward and a receptacle in communication with the bottom of the lateral runway at the outer end thereof connected to said receptacle.

In testimony whereof I hereunto affix my signature, in the presence of two witnesses, this 19th day of September, 1903.

ADAM EDGAR HUGULEY.

Witnesses:
  J. T. BRANSON,
  ANDY C. STOKES.